United States Patent

[11] 3,562,618

| [72] | Inventor | Athanase N. Tsergas<br>Des Plaines, Ill. |
|---|---|---|
| [21] | Appl. No. | 680,492 |
| [22] | Filed | Nov. 3, 1967 |
| [45] | Patented | Feb. 9, 1971 |
| [73] | Assignee | Ram Tool Corporation<br>Chicago, Ill.<br>a corporation of Illinois |

[54] TORQUE CONTROL CIRCUIT FOR ELECTRIC MOTORS
2 Claims, 3 Drawing Figs.

[52] U.S. Cl. .................................................. 318/246,
318/249, 318/257, 318/332
[51] Int. Cl. .................................................. H02p 5/06
[50] Field of Search ........................................ 318/249-
—332, (Cursory), 227, 356, 430—434, 246, 256,
257, 258, 293

[56] References Cited
UNITED STATES PATENTS

| 3,214,667 | 10/1965 | Foster et al. | 318/332 |
|---|---|---|---|
| 3,230,437 | 1/1966 | Capello | 318/332 |
| 3,307,093 | 2/1967 | Wright | 318/227 |
| 3,328,606 | 6/1967 | Pinckaers | 321/45 |
| 3,364,408 | 1/1968 | Katz et al. | 318/227 |
| 3,373,328 | 3/1968 | Hobo | 318/138 |
| 3,416,055 | 12/1968 | Toth, Jr. | 318/227 |
| 3,204,168 | 8/1965 | Depenbrock et al. | 318/293 |
| 3,257,597 | 6/1966 | Weiser | 318/332 |
| 3,273,018 | 9/1966 | Goldberg | 317/20 |
| 3,363,160 | 1/1968 | Morris | 318/345 |
| 3,390,317 | 6/1968 | Desisto | 318/345 |
| 3,421,063 | 1/1969 | Reinke | 318/203 |

Primary Examiner—Oris L. Rader
Assistant Examiner—K. L. Crosson
Attorney—Hill, Sherman, Meroni, Gross and Simpson ABSTRACT: A torque control circuit wherein a silicon controlled rectifier is connected in series with the field and armature of an electric motor and is gated by a pickup winding which is magnetically coupled to the field of the motor such that the motor speed depends upon motor load current.

PATENTED FEB 9 1971 3,562,618
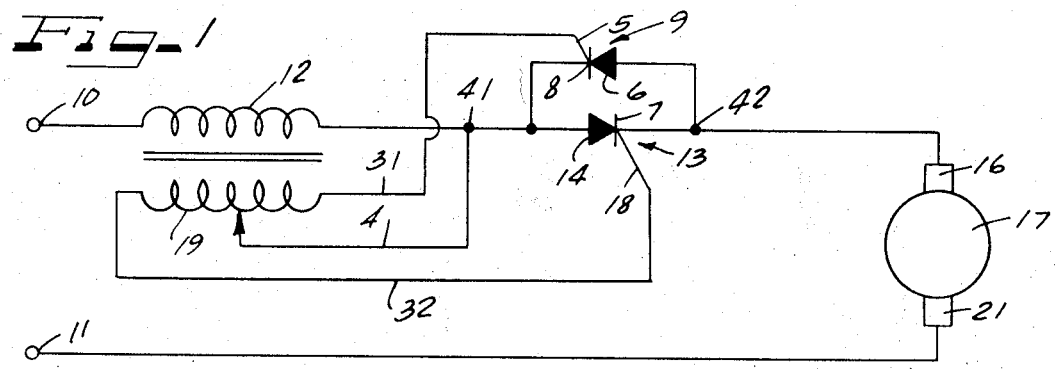
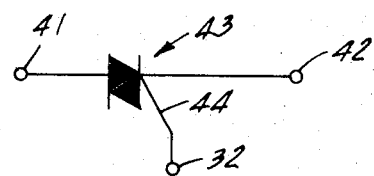
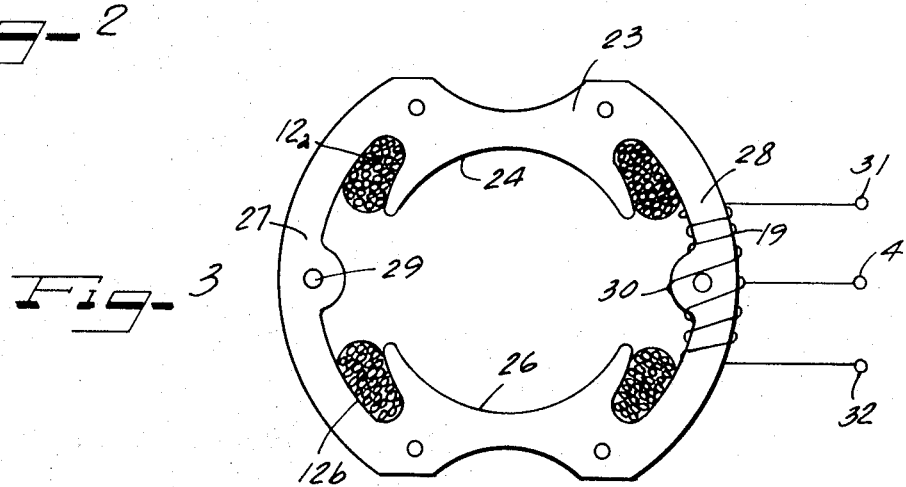
INVENTOR.
ATHANASE N. TSERGA
BY *Hill, Sherman, Meroni, Gross & Simpson* ATTORNEYS 3,562,618

TORQUE CONTROL CIRCUIT FOR ELECTRIC MOTORS

This invention relates in general to a torque control circuit for a motor and in particular to a silicon controlled rectifier circuit which adjusts the motor torque as required by the load.

Often motors will start at slow speed and speed up depending on the load on the motor. For example, if a motor is being used as a drill, the hardness of the material determines the speed of a conventional motor. The present invention relates to a control circuit in which the torque on the motor controls the operating speed of the motor. In other words, if the motor is being used to drive a drill when hard material is being drilled more torque is required by the motor. The increased torque required will cause a heavier current to flow through the motor armature and field and a gating silicon controlled rectifier in circuit with the armature of the motor is gated by a winding which is magnetically coupled to the motor's field to increase the power supplied to the motor.

It is an object of the present invention therefore to provide a novel torque control circuit for a motor.

Another object of the invention is to provide a magnetic coupling to the motor's field which measures the flux being produced in the motor field and to control a gate so as to increase the torque output of the motor.

Another object of this invention is to provide a simplified novel torque control circuit which is inexpensive.

A feature of this invention is found in the provision for an electric motor having an armature and field and with a silicon controlled rectifier mounted in series with the armature and magnetically coupled to a pickup winding energized by the motor's field so that the silicon controlled rectifier is biased to gate greater power to the motor as the torque required is increased.

Further features, objects and advantages of this invention will become apparent from the following description and claims when read in view of the drawings in which:

FIG. 1 is a schematic diagram of the torque control circuit of this invention;

FIG. 2 shows a modification of the invention; and

FIG. 3 is a sectional view through the stator of the motor showing the motor field and pickup winding.

FIG. 1 shows a pair of input terminals 10 and 11. A motor field 12 has its input side connected to terminal 10 and its output side connected to the anode shown as 41 of a silicon controlled rectifier 13 and to the cathode 8 of a silicon controlled rectifier 9. The cathode 7 of the silicon controlled rectifier 13 and the anode 6 of silicon controlled rectifier 9 are connected to brush 16 of a motor 17. The other brush 21 of the motor is connected to the input terminal 11 by the line 22.

A pickup winding 19 is magnetically coupled to the motor field winding 12 and has its midpoint connected to one side of winding 12, one end is connected to the control electrode 18 of silicon controlled rectifier 13 and the other end is connected to the control electrode 5 of the silicon controlled rectifier 9.

FIG. 3 is a sectional view through the stator of motor 17 and illustrates a laminated section 23. The motor windings are indicated as 12a and 12b. The stator section 23 comprises a generally annular ring formed with central pole pieces 24 and 26 which couple the magnetic field to the armature of the motor. A pair of coupling sections 27 and 28 complete the magnetic circuit and form the supporting structure for the stator. Mounting holes 29 and 30 are provided through the sections 27 and 28 and are utilized to clamp the stator together.

Pickup winding 19 is wound around section 28 and provides an output to terminals 31 and 32 respectively. The midpoint is connected to terminal 4.

If the motor is operating with no load with a no-load current of 2 amperes, for example, with each pole of the motor winding having 150 turns per coil, then the flux generated would be proportional to the ampere turns or 150×2 or 300 ampere turns. If the motor is loaded the current will increase from 2 amperes to 3, 4, 5, amperes depending upon the actual load applied to the motor. This will increase approximately linearly the flux from 300 to 450, 600, 750 ampere turns, respectively.

At the same time, the pickup winding 19, which is magnetically coupled to the field winding of the motor, will produce a bias voltage on the silicon controlled rectifiers 9 and 13 that increases with the ampere turns. This, of course, is also dependent upon the number of turns and the closeness of coupling of the winding 19. But in a specific example, assume that 300 ampere turns gives an output of one volt between terminals 4 and 31 and 4 and 32, and that a 450 ampere turn flux in the main field will give an output of 1.5 volts at these terminals and 600 ampere turns will give a 2 volt output and 750 turns will give a 2.5 volt output.

The increase in bias potential applied to the control electrodes 5 and 18 of the SCRs will gate more and more of the applied signal to the motor and thus allow the motor to maintain its speed as the torque output from the motor is increased. The SCRs comprise primarily gating devices wherein the gating level is varied by the voltage on the control electrodes 5 and 18.

FIG. 2 illustrates a triac available on the market which comprises a two-way silicon controlled rectifier with a control electrode 44. Control electrode 44 would be connected to contact 32 of winding 19. One side of the triac would be connected to one side 42 of the field winding 12 and the other side of the triac 43 would be connected to terminal 42 which connects to brush 16 of the motor 17. The triac operates in the same fashion as the SCRs 9 and 13 in FIG. 1.

If the bias voltages on control electrodes 5 and 18 are in a particular example, 1 volt, then the SCRs will gate a particular voltage to the motor. Pulses of these widths will be sufficient to maintain the motor operating at a constant speed at no load, for example.

If the torque requirement on the moor is changed the motor will draw more current and this will result in a higher pickup bias voltage on the pickup winding 19 due to its coupling to the field 12. In this event, if the bias voltage increases to 2 volts, then more power will be applied to the motor. It is seen that substantially more power may be obtained and the motor will continue to run at a substantially constant speed even though the load is higher. This will continue until the entire applied voltage is across the motor brushes when maximum output torque will be generated by the motor.

It is seen that this structure provides a torque control device in which the load on the motor controls the speed. The motor would normally start at a relatively low speed and would speed up depending upon the load. For example, if the motor was mounted in a hand drill and paper was being drilled, very low torque would be required and the motor would operate at a speed which is relatively low with a relatively small power. As the load on the drill is increased, for example, by drilling harder material, then the current through the armature will be increased and the amount of applied voltage gated by the silicon controlled rectifiers will increase to thus let the motor adjust to the increased load.

The principles of the invention explained in connection with the specific exemplification thereof will suggest many other applications and modifications of the same. It is, accordingly, desired that in construing the breadth of the appended claims they shall not be limited to the specific details shown and described in connection with the exemplification thereof.

I claim:

1. A circuit for controlling the torque of an electric motor of a hand-operated power tool having a series field winding comprising;

a pickup winding mounted on the stator core and magnetically coupled to the field winding and producing a pair of bias output signals of opposite polarity and proportional to the field current;

a gated device connected in series with the series combination of armature and field winding and one of the motor terminals;

the gated device comprising a pair of silicon controlled rectifiers with the anode of one connected to the cathode of the other, and the cathode of the one connected to the anode of the other, one of said bias output signals connected to the gate of the first silicon controlled rectifier, and the other bias output signal connected to the gate of the second silicon controlled rectifier, so that the first and second silicon controlled rectifiers are gated to conduct current proportional to the load on the motor.

2. The circuit of claim 1 wherein said gated device comprises a triac.